United States Patent [19]
van Eikeren et al.

[11] Patent Number: 5,263,409
[45] Date of Patent: Nov. 23, 1993

[54] MEMBRANE EXTRACTION OF CITRUS BITTERING AGENTS

[75] Inventors: Paul van Eikeren; Daniel J. Brose, both of Bend, Oreg.

[73] Assignee: Bend Research, Inc., Bend, Oreg.

[21] Appl. No.: 872,602

[22] Filed: Apr. 24, 1992

[51] Int. Cl.$^5$ .................. A23N 1/00; A23N 15/00; A23L 2/00; A23L 2/30
[52] U.S. Cl. .......................... 99/534; 99/469; 99/495; 99/496; 99/516; 99/275; 426/422; 426/599
[58] Field of Search .............. 99/485, 516, 534–536, 99/495, 496, 469, 275; 426/422, 599, 330.5, 271; 521/31, 33

[56] References Cited

U.S. PATENT DOCUMENTS

| | | | |
|---|---|---|---|
| 2,527,364 | 10/1950 | Koffler | 99/534 X |
| 4,246,838 | 1/1981 | Pulver et al. | 99/536 X |
| 4,282,264 | 8/1981 | Magnolato | 426/599 |
| 4,313,372 | 2/1982 | Gerow et al. | 99/483 |
| 4,335,145 | 6/1982 | Stanley | 99/495 X |
| 4,514,427 | 4/1985 | Mitchell et al. | 426/422 X |
| 4,543,879 | 10/1985 | Catelli | 99/516 X |
| 4,555,987 | 12/1985 | Tumlinson | 99/495 X |
| 4,965,083 | 10/1990 | Norman et al. | 426/422 |
| 5,007,335 | 4/1991 | Orman et al. | 99/516 X |
| 5,088,393 | 2/1992 | Nahir et al. | 99/516 |

*Primary Examiner*—Timothy F. Simone
*Attorney, Agent, or Firm*—Chernoff, Vilhauer, McClung & Stenzel

[57] ABSTRACT

There are disclosed two types of apparatus using membrane extractions of citrus juice bittering agents, both using extraction fluids. In one type, a membrane contactor facilitates contact between bittering agents present in a citrus juice feed and a hydrophobic bittering agents extraction fluid; a second membrane contactor may be used to extract bittering agents from the hydrophobic extraction fluid by use of a basic stripping fluid on the permeate side. In a second type, an immobilized liquid membrane containing hydrophobic extraction fluid supported within the pores of a microporous hydrophobic polymeric membrane is used to facilitate transport of bittering agents across the membrane.

9 Claims, 3 Drawing Sheets

MEMBRANE EXTRACTION OF CITRUS BITTERING AGENTS

The government has an irrevocable royalty-free non-exclusive license in this invention pursuant to Contract No 88-33610-3369 awarded by the U.S. Department of Agriculture.

BACKGROUND OF THE INVENTION

A multimillion dollar problem for the citrus industry worldwide is the formation of bitterness in citrus juice within hours after extraction of the juice from the fruit. The primary cause of such delayed bitterness is the formation of the bittering agents limonoids and flavonoids. In oranges, lemons and tangerines, the principal limonoids are limonin and nomilin Grapefruit principally contains the flavonoid naringin, with a minor amount of nomilin. A number of methods have been developed to reduce or extract such bittering agents, including preharvest treatment by an auxin plant growth regulator to inhibit nomilin biosynthesis, supercritical carbon dioxide extraction of limonin at 4000 psi, extraction of naringin and limonin from grapefruit with cross-linked polystyrene resin monomers (U.S. Pat. No. 4,514,427), and adsorption of both bittering agents and acid with a lignin-type adsorbent derived from carob seed (U.S. Pat. No. 4,282,264). Each of these methods has drawbacks, e.g., auxin plant growth regulators are expensive, high pressure supercritical extraction is highly energy-consuming, and adsorption of acid components along with bittering agents deleteriously affects flavor. The primary solution to the bitterness problem has been to simply blend excessively bitter juice (containing >12 ppm limonin) with non-bitter juice (<6 ppm limonin).

There is therefore still a need in the art for a bittering agents removal process that is selective, simple, efficient, inexpensive and that has no impact on the flavor of the citrus juice These needs and others are met by the present invention, which is summarized and described in detail below.

SUMMARY OF THE INVENTION

There are essentially two aspects to the invention: (1) a membrane contactor apparatus for the removal of bittering agents from citrus juices; and (2) a supported liquid membrane apparatus for the removal of bittering agents from citrus juices.

The basic membrane contactor apparatus comprises
(a) a membrane which is permeable to citrus bittering agents,
(b) means for feeding a bittering agents-containing citrus juice across a feed side of the membrane, and
(c) means for feeding an extraction fluid across a permeate side of the membrane, the extraction fluid being capable of extracting the bittering agents but substantially not water-absorbing, whereby the bittering agents in the citrus juice feed diffuse through the membrane into the extraction fluid to produce bittering agents-depleted citrus juice on the feed side of the membrane and a bittering agents-enriched extraction fluid on the permeate side of the membrane.

The basic supported liquid membrane apparatus comprises
(a) a supported liquid membrane which is permeable to citrus bittering agents, the liquid membrane comprising an extraction fluid capable of extracting citrus bittering agents and being supported within the pores of a hydrophobic polymeric membrane,
(b) means for feeding bittering agents-containing citrus juice across a first side of the hydrophobic polymeric membrane, and
(c) means for feeding a basic aqueous stripping fluid across a second side of the hydrophobic polymeric membrane, whereby the bittering agents in the citrus juice feed diffuse through the liquid membrane into the basic aqueous stripping fluid to produce a bittering agents-depleted citrus juice on the first side of the hydrophobic polymeric membrane and a bittering agents-enriched stripping fluid on the second side of the hydrophobic polymeric membrane.

DETAILED DESCRIPTION OF THE INVENTION

According to the present invention there are provided membrane-based apparatus and methods of removing bittering agents from citrus juices.

Figure 1:
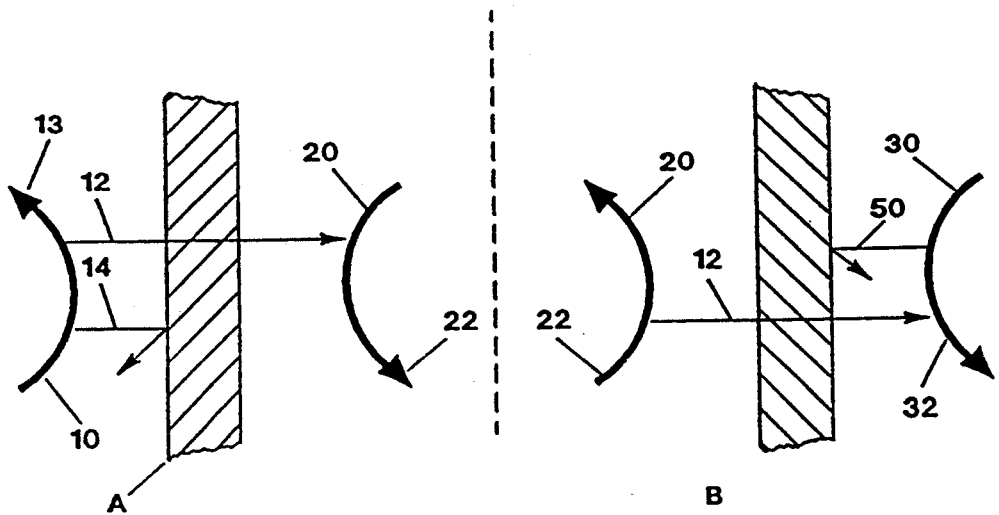
FIG. 1 is a schematic of a pair of exemplary separation membrane contactor-type separation membranes and their use in the present invention.

Referring to the drawings, wherein like numerals refer to the same elements, on the left side of FIG. 1 there is shown an important feature of an exemplary citrus apparatus, comprising a semipermeable membrane A that functions as a membrane contactor, facilitating contact between bittering agents present in a citrus juice feed 10 on a first or feed side of the membrane and a hydrophobic bittering agents-extraction fluid 20 on a second or permeate side of the membrane. The membrane A is permeable to bittering agents 12 which, due to the membrane's permeability thereto and to their extraction into extraction fluid 20, diffuse across the membrane, leaving a bittering agents-depleted citrus juice 13 on the feed side of the membrane The membrane is substantially impermeable to flavor and nutritional components 14, which remain on the feed side of the membrane with the bittering agents depleted citrus juice. Bittering agents 12 are extracted into extraction fluid 20 on the permeate side of the membrane to form a bittering agents-enriched extraction fluid 22 on the permeate side.

On the right side of FIG. 1, there is shown a second semipermeable membrane B that functions as a second membrane contactor to remove bittering agents 12 from bittering agents-enriched extraction fluid 22 so that extraction fluid 20 may be recycled to the permeate side of membrane A to again extract bittering agents from the citrus juice feed. Basic (pH 10 to 14) aqueous stripping fluid 30 is circulated on the permeate side of membrane B, diffuses into membrane B to the left, or "feed" side and ionizes bittering agents from that side of the membrane, whereby they become soluble in stripping fluid 30 and insoluble in extraction fluid 20. Bittering agents thereby diffuse across the membrane from the feed to the permeate side to form a bittering agents-depleted extraction fluid 20 on the feed side of membrane B (which is preferably recycled to the permeate side of membrane A) and a bittering agents-enriched stripping fluid 32 on the permeate side of membrane B. The chemistry of this transport is fundamentally as follows. The limonoids and flavonoids limonin, nomilin and naringin bear no charges and are soluble in the hydrophobic extraction fluid 20 between the two membranes A and B and diffuse across first membrane A, then across membrane B to the basic strip fluid which hydrolyzes them to the anionic form such as limonate, which is insoluble in the hydrophobic extraction fluid 20, and therefore cannot diffuse back across membrane B. This mechanism is exemplified by the reaction scheme $$L_6(COO)_2 + 2OH^- \rightarrow L_4(COO^-)_2$$

where $L_6$ is the six ring-containing limonin structure and $L_4$ is the four ring-containing limonate structure. The hydrolyzed acid forms of limonin, nomilin and naringin may also be present in the feed, but at the acidic pH of the feed, the carboxyl groups thereof are substantially soluble in the hydrophobic extraction fluid 20. On the strip side of membrane B, the dicarboxylic acid forms are also hydrolyzed to the anionic form such as limonate, thereby preventing their back diffusion. This mechanism is exemplified by the reaction $$L_4(COOH)_2 + 2OH^- \rightarrow L_4(COO^-)_2 + 2H_2O.$$

This "trapping" and removal of the anionic forms of the Th bittering agents on the second side of membrane B provides the driving force for further diffusion (and subsequent removal) of the bittering agents through the membrane contactor. Thus, on the first side of membrane A, a bittering agents-reduced citrus juice 13 is produced that contains flavor and nutritional components 14, while on the second side of membrane B a bittering agents-enriched stripping fluid 32 is produced, while the component 50 comprising anionic forms of bittering agents cannot back diffuse.

Figure 2:
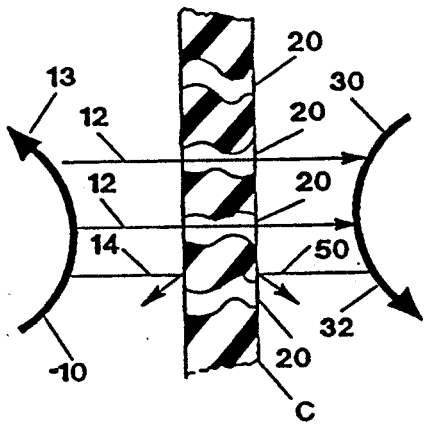
FIG. 2 is a schematic of an exemplary supported-liquid separation membrane and its use in the invention.

The preferred form of the membranes for both embodiments depicted in FIGS. 1 and 2 is a hollow fiber, although flat sheet and tubular forms will also work. For hydrophilic membranes, preferred materials are cellulose and polyacrylonitrile and in general any membrane that has been rendered hydrophilic. When the membrane(s) of the membrane contactor are hydrophobic, preferred materials are selected from polytetrafluoroethylene, polyethylene, polypropylene, polysulfone, polyethersulfone, and polyvinylidene fluoride.

In FIG. 2 there is depicted a second type of semipermeable membrane useful in a debittering apparatus, an immobilized liquid membrane, comprising hydrophobic extraction fluid 20 immobilized and supported within the pores of a microporous hydrophobic polymeric membrane C. Preferred hydrophobic membranes are made of the same polymers noted above for hydrophobic membrane contactors. Citrus juice feed 10 at an acidic pH (say 3.2) containing bittering agents 12 is circulated on a first side of membrane C, while a basic (pH of, for example, 10 to 14) aqueous stripping fluid 30 is circulated on a second side. Bittering agents 12 in the feed 10 dissolve in the hydrophobic immobilized extraction fluid 20 and are transported across the membrane by diffusion to the second or strip side. The chemistry of the transport is the same as for the separation discussed in connection with FIG. 1, except that extraction fluid 20 is within the pores of membrane C instead of between the two membranes A and B, and bittering agents 12 permeate the supported-liquid membrane C through the extraction fluid 20 and are hydrolyzed by the basic stripping fluid 30 into the anionic form 50 which cannot diffuse back through the supported-liquid membrane due to its insolubility in the extraction fluid 20.

Preferred extraction fluids are organic solvents for which limonoids and flavonoids have a partition coefficient of at least 5. A preferred class of such organic solvents is lower alkyl esters of carboxylic acids containing from 6 to 15 carbon atoms and aliphatic and aromatic alcohols containing from 8 to 35 carbon atoms. Of this preferred class, especially preferred organic extraction fluids are tocopherol or tocopherol acetate in mineral oil, 1-decanol, ethyl hexanoate, ethyl octanoate, ethyl decanoate, and ethyl dodecanoate.

EXAMPLES 1-6

Figure 3:
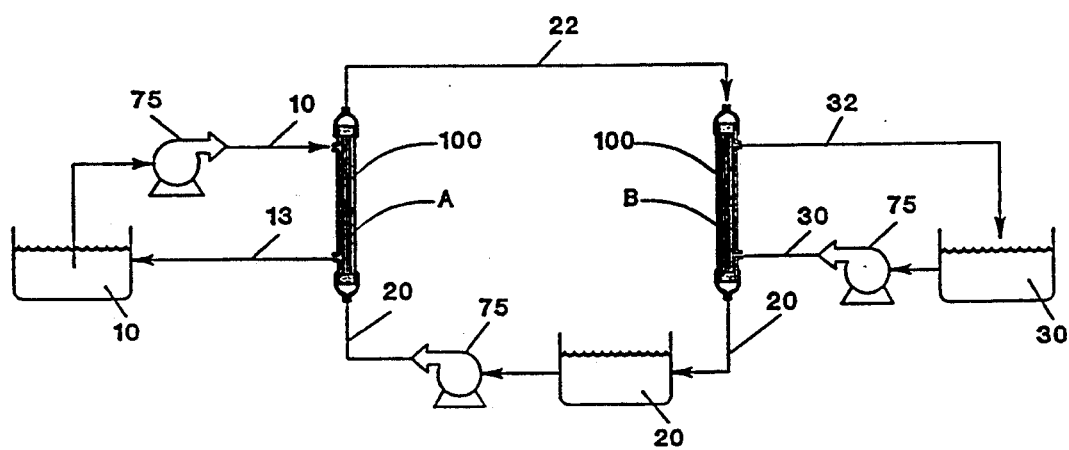
FIG. 3 is a schematic of an exemplary batch-type citrus debittering extraction apparatus.

A citrus juice debittering apparatus of substantially the configuration shown in FIG. 3, comprising two modules 100, each containing 9.8 sq ft of cellulose hollow fiber membranes A and B (Model CF 15-11from Travenol Laboratories of Deerfield, Ill.) were linked to each other and to pumps 75 for continuous operation by stainless steel tubing and valves; the pumps were peristaltic pumps containing silicon tubing. A feed solution 10 comprising reconstituted orange juice (pH 3.2) "spiked" with 20 ppm limonin was fed from a reservoir at <5 psi and 10 ml/sec to the "shell" side or outside of the hollow fiber membranes A. Various organic solvent extractants 20 were fed from a reservoir at 15 psi (to avoid water transport from either the feed or strip streams) and 16 ml/sec to the lumens or inside of the hollow fiber membranes A, and then to the lumens of membrane B and back to the reservoir. An aqueous strip stream 30 at pH 12-13 was fed from a reservoir to the shell side of hollow fiber membranes B at <5 psi and 16 ml/sec.

In operation, the bittering agents-containing citrus juice feed 10 was circulated in the shell side of the membranes A while the organic extractant 20 was circulated on the inside of the same membranes. Bittering agents such as limonin and limonoic acid diffused across the hollow fiber membrane wall A and dissolved into the organic extractant, leaving behind a bittering agents-depleted citrus juice 13. From that point, bittering agents-enriched organic solvent 22 was transported to and circulated within the inside of hollow fiber membranes B. At the same time, strip solution 30 was circulated on the shell side of membranes B. The bittering agents then diffused across the hollow fiber membrane wall B, dissolving in, then being ionized by the basic strip solution, effectively "trapping" them on the shell side of membranes B, and producing both a bittering agents-enriched strip solution 32 and a bittering agents-depleted organic solvent 20 for recycling to the reservoir and back to the lumens of hollow fibers A.

During the course of operation of the debittering apparatus for approximately 30 minutes, samples were taken from the orange juice feed stream and analyzed for limonin and ascorbic acid, and showed a steady decline in limonin concentration to its final concentration. The results are shown in Table 1.

TABLE 1

| Ex. No. | Extractant | Limonin Permeability (cm/hr) | Limonin Concentration (ppm) | Ascorbic Acid Concentration (ppm) |
|---|---|---|---|---|
| — | — | — | ~20* | 190 ± 5* |
| 1 | 1-decanol | 0.4 | 3 | ** |
| 2 | ethyl hexanoate | 0.3 | 3 | ** |
| 3 | ethyl octanoate | 0.2 | 1 | ** |
| 4 | ethyl decanoate | 0.2 | 1 | ** |
| 5 | ethyl dodecanoate | 0.6 | 4 | 164 ± 5 |
| 6 | tocopherol (20 vol %) in mineral oil | 0.1 | 3 | 181 ± 2 |
| 7 | tocopherol acetate (30 vol %) in mineral oil | 0.1 | 4 | ** |

*initial concentration
**not measured

As is apparent, limonin concentration was reduced to well below the 6 ppm threshold bitterness value, while the concentration of ascorbic acid, a primary nutritional component, was virtually unaffected. It was also observed that the permeability of limonin remained constant during the course of the separation, indicating that the membrane was not fouled by orange juice, nor was its permeability to limonin otherwise altered.

EXAMPLE 7

Figure 4:
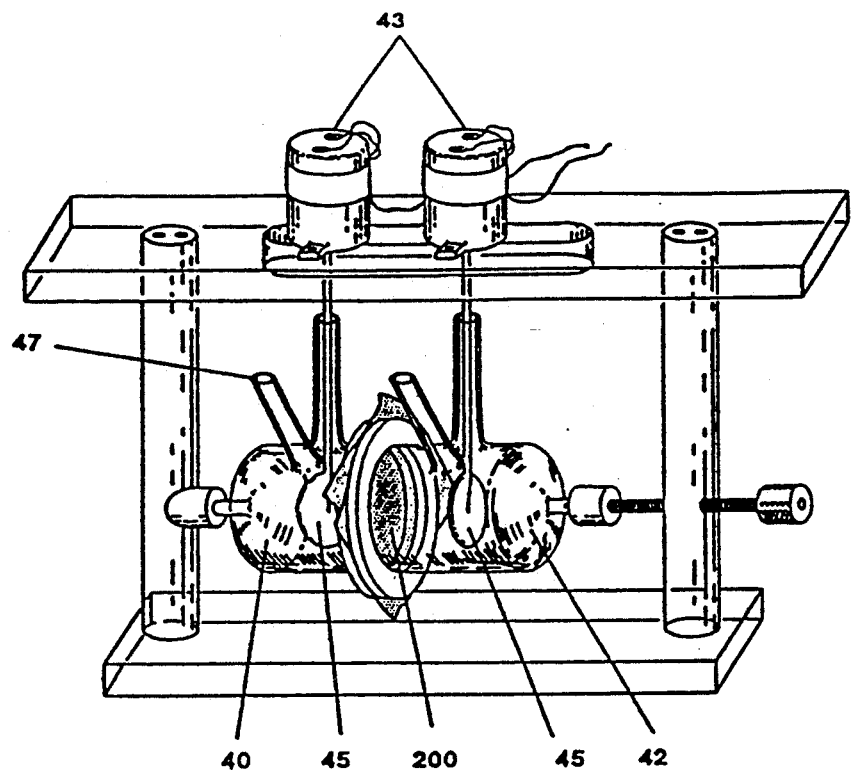
FIG. 4 is a schematic of another exemplary batch-type citrus debittering extraction apparatus.

A supported-liquid membrane comprising Shell Sol 71 (a mixture of aliphatic solvents approved for food contact from Shell Chemical Co.) supported in the pores of a flat-sheet microporous polypropylene membrane 200 (Celgard 2400 manufactured by Celanese Separations, Inc. of Charlotte, N.C.) was clamped between the feed compartment 40 and product compartment 42 of the membrane-permeability apparatus illustrated in FIG. 4. The feed compartment 40 was filled with an aqueous solution of 55 ppm limonin dissolved in 20 vol% acetic acid (pH 3.2), and the strip compartment 42 was filled with 0.01M aqueous sodium hydroxide (pH 12). The aqueous solutions in the two compartments were stirred by stir motors 43 and stir paddles 45 and their temperatures maintained at 25° C. The concentration of limonin in the feed compartment 40 was monitored as a function of time by removing aliquots via sampling port 47 and assaying the limonin concentration by High Performance Liquid Chromatography.

Figure 5:
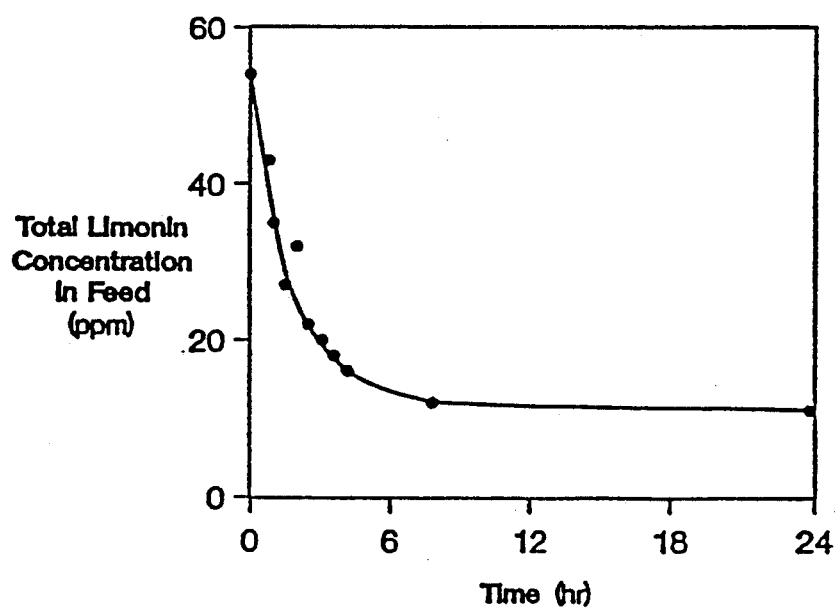
FIG. 5 is a graph showing the effectiveness of extraction with the apparatus of FIG. 4.

The results, shown in FIG. 5, show that the membrane process effectively reduced limonin in the feed to 11 ppm, and follows the theoretical exponential loss of limonin in the feed with a permeability coefficient of 1.1 cm/hr.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. An apparatus for producing from a first citrus juice a second citrus juice of reduced bitterness comprising:
   (a) a first semipermeable membrane which is selectively permeable to citrus bittering agents and having a feed side and a permeate side;
   (b) means for directing said first citrus juice across said feed side of said first membrane; and
   (c) means for directing a hydrophobic bittering agents-extraction fluid across said permeate side of said first membrane,
   whereby bittering agents in said first citrus juice diffuse through said first membrane to said extraction fluid to produce said second citrus juice on the feed side of said first membrane and a bittering agents-enriched extraction fluid on the permeate side of said first membrane.

2. The apparatus of claim 1, including:
   (d) a second semipermeable membrane which is selectively permeable to citrus bittering agents and having a feed side and a permeate side;
   (e) means for directing said bittering agents-enriched extraction fluid across said feed side of said second membrane;
   (f) means for directing a basic aqueous stripping fluid across said permeate side of said second membrane; and
   (g) means for recycling said extraction fluid to said permeate side of said first membrane
   whereby said bittering agents diffuse from said bittering agents-enriched extraction fluid on the feed side of said second membrane into said basic aqueous stripping fluid on the permeate side of second membrane to produce a bittering agents-depleted extraction fluid on the feed side of said second membrane which is recycled to the permeate side of said first membrane.

3. The apparatus of claim 2 wherein said first and second membranes are hollow fibers.

4. The apparatus of claim 2 wherein said first and second membranes are hydrophilic.

5. The apparatus of claim 4 wherein said hydrophilic membranes are selected from the group consisting of cellulose and polyacrylonitrile.

6. The apparatus of claim 1 or 2 wherein said extraction fluid is an organic solvent.

7. The apparatus of claim 6 wherein said organic solvent is selected from lower alkyl esters of carboxylic acids containing from 6 to 15 carbon atoms and aliphatic and aromatic alcohols containing from 8 to 35 carbon atoms.

8. The apparatus of claim 7 wherein said organic solvent is selected from the group consisting essentially of tocopherol, tocopherol acetate, 1-decanol, ethyl hexanoate, ethyl octanoate, ethyl decanoate, and ethyl dodecanoate.

9. The apparatus of claim 1 or 2, including means for varying said first citrus juice flow rate relative to the surface area of said first or second membrane to control the degree of bittering agents removal from said first citrus juice.

* * * * *

UNITED STATES PATENT AND TRADEMARK OFFICE
CERTIFICATE OF CORRECTION

PATENT NO.   :   5,263,409
DATED        :   November 23, 1993
INVENTOR(S)  :   Daniel J. Brose and Paul vanEikeren It is certified that error appears in the above-identified patent and that said Letters Patent is hereby corrected as shown below:

Column 1, Line 17:   After "nomilin" insert -- . --.

Column 2, Line 50:   After "membrane" insert -- . --.

Column 2, Line 60:   Delete "contractor" and insert -- contactor --.

Column 3, Line 35:   Delete "Th"

Column 4, Line 28:   Insert a space between 11 and from

Column 6, Line 15:   After membrane delete "to" and insert -- into --.

Signed and Sealed this

Sixteenth Day of August, 1994

Attest:

BRUCE LEHMAN

Attesting Officer          Commissioner of Patents and Trademarks